Aug. 17, 1954 L. L. SNYDER 2,686,528
FLUID PRESSURE TRIP CONTROLLED VACUUM BREAKER
Filed Feb. 6, 1950 2 Sheets-Sheet 1

INVENTOR.
LEONARD L. SNYDER
BY Lyon & Lyon
ATTORNEYS

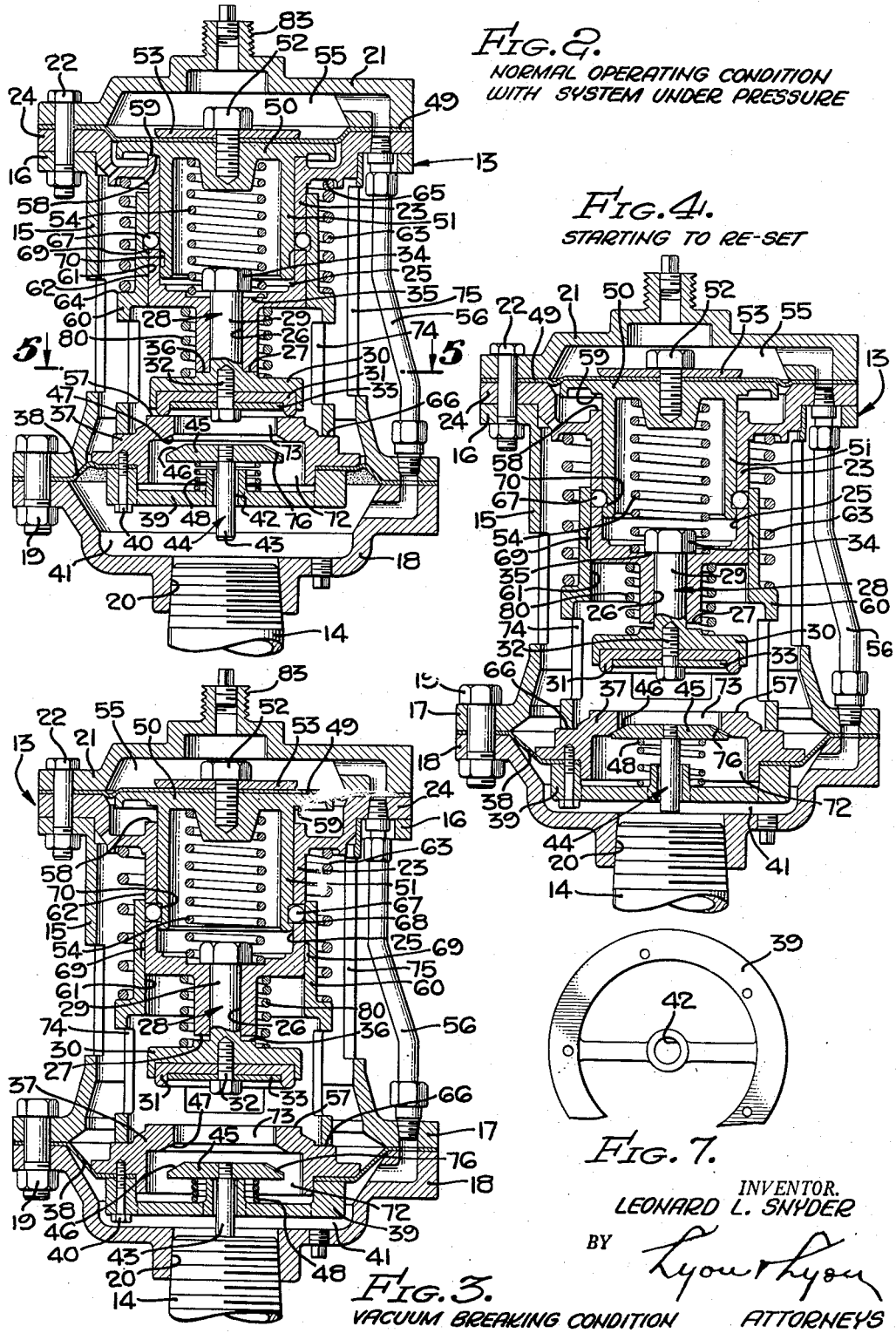

Patented Aug. 17, 1954

2,686,528

UNITED STATES PATENT OFFICE 2,686,528

FLUID PRESSURE TRIP CONTROLLED VACUUM BREAKER

Leonard L. Snyder, Los Angeles, Calif., assignor to Backflow Engineering & Equipment Company, Los Angeles, Calif., a corporation of California Application February 6, 1950, Serial No. 142,625

17 Claims. (Cl. 137—217)

This invention relates to backflow prevention apparatus and is particularly directed to a new and improved type of vacuum breaker.

Vacuum breakers of the type used in preventing backflow from a consumer's line to a service line, for example, commonly utilize subatmospheric pressure to apply a force to open a valve so that atmospheric air may be drawn into the service line and thereby minimize the possibility of drawing liquid from a consumer's line into a service line. It is important to avoid the latter possibility because the liquid in the consumer's line may be contaminated, and if such liquid is drawn into the service line, the contamination may spread throughout the system.

It is important that vacuum breakers operate instantly upon subatmospheric pressure occurring in the service line because any considerable lag or sluggishness in operation may allow polluted liquid to be drawn into the service line.

Since private and public health may be vitally dependent upon prevention of back-siphonage, it is imperative that the vacuum breaker be reliable in operation. In the past, some vacuum breakers have been constructed having an operation dependent entirely upon subatmospheric pressure or partial vacuum existing in the service line. When the partial vacuum was very slight, often sufficient force was not generated to open the breaker, and back-siphonage occurred. Other vacuum breakers had been made that are continually urged to an open position by a weight or spring. If this opening force were sufficiently great to insure opening under vacuums of low intensity, difficulty was experienced in preventing excessive leakage under low service line pressures. It is highly desirable to have the vacuum breaker open positively upon the slightest vacuum occurring in the service line. In fact, in many cases it may be desirable to have it open slightly before the partial vacuum actually exists and at the same time avoid excessive spillage.

Furthermore, this difficulty is complicated by the fact that ordinarily, vacuum breaker valve assemblies are called upon to operate only infrequently. Long periods of time may pass without any action by the vacuum breaker, and therefore the moving parts thereof may become stuck together so that frictional resistance opposing movement of the parts is very high. Accordingly, after a long period of inaction a much greater pressure differential may be required to open the vacuum breaker, and hence polluted water may be sucked into the service line for some time before the vacuum breaker functions.

It is the principal object of my invention to avoid these difficulties and to provide a vacuum breaker assembly which can be relied upon to open as soon as pressure in the service line falls below a predetermined value.

Another object of my invention is to provide a vacuum breaker in which the forces operating to open the valve are not developed by reduction in pressure in the service line.

Another object is to provide a vacuum breaker assembly having stored energy means operable to open the valve and having pressure operated latch means normally maintaining the stored energy means ineffective.

A more particular object is to provide a vacuum breaker assembly having a spring arranged to open a valve and having latch means effective to hold the spring in latched position, the latch means being actuated to allow the spring to open the valve whenever the pressure in the service line falls below a predetermined value.

Other and more detailed objects and advantages will appear more fully hereinafter.

In the drawings:

Figure 2 is a longitudinal sectional elevation showing the parts of the vacuum breaker in normal operating condition with the system under pressure.

Figure 3 is a sectional view similar to Figure 2 showing the parts in vacuum breaking position.

Figure 4 is a view similar to Figure 2 with the parts in fully opened position and starting to re-set.

Figure 7 is a detail plan view, partly broken away, showing the valve guide member for the check valve.

Figure 1:
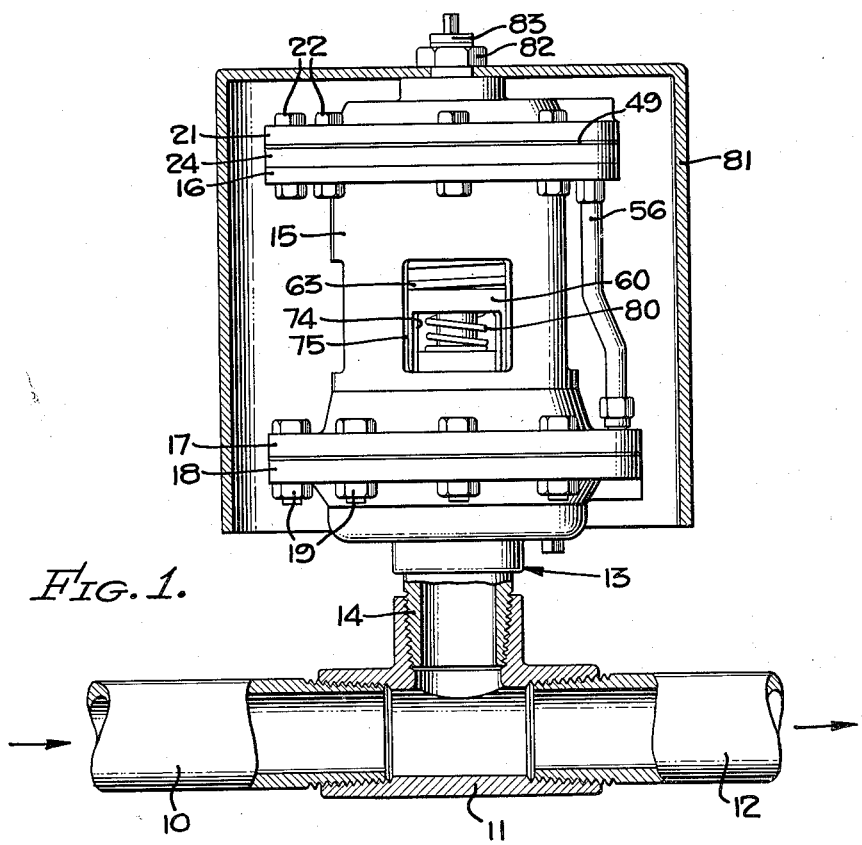
Figure 1 is a side elevation partly in section showing a preferred embodiment of my invention.
Figures 5, 6:
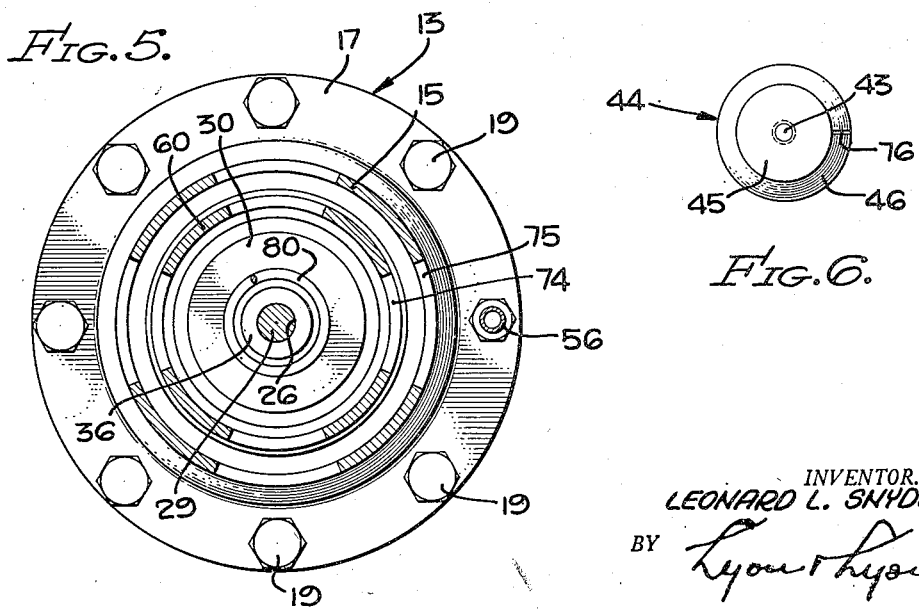
Figure 5 is a sectional plan view taken substantially on lines 5—5 as shown in Figure 2.
Figure 6 is a plan view of the weighted check valve employed in connection with the vacuum breaker assembly.

Referring to the drawings, the service line 10 may deliver water under pressure to the T fitting 11 and into the consumer's line 12. The vacuum breaker assembly generally designated 13 is also connected to the T fitting 11. In general, the function of the vacuum breaker assembly 13 is to introduce atmospheric air into the T fitting 11 and service line 10 in the event that subatmospheric pressure should develop in the service line 10. In this way, the possibility of sucking polluted water from the consumer's line 12 into the service line 10 is minimized.

Referring to Figure 1, the vacuum breaker assembly 13 is connected to the T fitting 11 by means of a threaded nipple 14. The assembly 13 includes a central ported body 15 having an upper flange 16 and a lower flange 17. A flanged lower end cap 18 is connected to the body flange 17 by means of a plurality of bolts 19, and this end cap is threaded at 20 to receive the nipple 14. The upper end cap 21 is also flanged, and it is connected to the upper body flange 16 by means of bolts 22. A fixed sleeve 23 is provided with a flange 24, and this flange is also connected to the body 15 by means of the bolts 22. The sleeve 23 extends axially within the body 15 and is provided with axially aligned cylindrical bores 25 and 26. The lower end of the sleeve terminates in an annular shoulder 27.

A valve, generally designated 28, includes a stem 29 slidably mounted within the bore 26. Formed integrally with the stem is an enlarged head 30 which carries a sealing ring 31. A threaded element 32 cooperates with a retainer plate 33 for maintaining the sealing ring 31 in position on the valve head 30. A nut 34 threaded on the upper end of the valve stem 29 is adapted to engage a shoulder 35 on the stationary sleeve 23 to limit downward movement of the valve 28. A shoulder 36 on the valve head 30 engages the shoulder 27 on the lower end of the sleeve 23 to limit upward movement of the valve 28.

Spring 80 encircles the stem and acts against a portion of the stationary sleeve 23 to move the valve head 30 toward a seat member 37.

The seat member 37 is designed to engage with the sealing ring 31 to form a fluid-tight seal. This seat 37 is mounted on the lower flexible diaphragm 38 which is annular in form and which is confined on its outer rim between the flange 17 on the body and the flange on the lower end cap 18. A retainer ring 39 is attached to the seat 37 by means of the bolts 40 and serves to clamp the inner annular portion of the diaphragm 38 between the retainer 39 and the seat 37. From this description, it will be understood that a pressure chamber 41 is defined within the lower end cap 18 and below the diaphragm 38.

The retainer 39 is provided with a central aperture 42 which receives the depending stem 43 of a weighted check valve generally designated 44. A valve head 45 is threadedly connected to the upper end of the stem 43 and is provided with a spherical or conical sealing face 46 which is adapted to engage a corresponding sealing face 47 provided on the under side of seat member 37. A relatively weak coil spring 48 rests on the retainer 39 and engages the under side of the valve head 45. The length and strength of spring 48 is such that check valve 44 normally rests between fully closed and fully open position.

An upper flexible diaphragm 49 is confined on its outer diameter between the flange on the upper end cap 21 and the flange 24 on the stationary sleeve 23. This flexible diaphragm 49 is circular and is centrally attached to the upper end 50 of movable latching sleeve 51. A threaded element 52 cooperates with a retainer ring 53 to clamp the central portion of the diaphragm 49 to the movable latching sleeve 51. A coil spring 54 is positioned within the interior of the latching sleeve 51. This spring engages the end 50 of the member 51 at one end and rests on the stationary sleeve 23 at its other end, and continually urges latching sleeve 51 in an upward direction.

The upper end cap 21 cooperates with the diaphragm 49 to define a pressure chamber 55. This pressure chamber 55 communicates with the pressure chamber 41 by means of the piping connection 56. From this description it will be understood that when hydraulic pressure is present in the service line 10, it is communicated through the nipple 14 to the pressure chamber 41 and is communicated to the pressure chamber 55 by way of the piping connection 56. Hydraulic pressure in the chamber 41 moves the seat 37 and retainer 39 upwardly until the sealing surface 57 on the seat 37 contacts the sealing ring 31. Upward movement of the seat 37 is limited by contact of the annular shoulders 27 and 36 on the stationary sleeve 23 and valve head 30 respectively. Pressure within the chamber 55 moves the latching sleeve 51 downwardly against the force of the spring 54 until the shoulder 58 on the stationary sleeve 23 engages the shoulder 59 provided on the underside of the end 50 of the latching sleeve 51.

A ported thrust collar 60 encircles the stationary sleeve 23 and is provided with a central bore 61 which is slidably mounted on the outer cylindrical surface 62 of the sleeve 23. A relatively strong coil spring 63 encircles the upper portion of the ported thrust collar 60. The lower end of the spring 63 engages a shoulder 64 on the ported thrust collar 60 and the upper end of the spring contacts the annular shoulder 65 on the stationary sleeve 23. The force of the relatively heavy spring 63 therefore acts to move the ported thrust collar downwardly, and since the lower end 66 of the thrust collar 60 rests on the seat 37, the action of the spring 63 is to move the seat member 37 downwardly.

Means are provided for normally latching the ported thrust collar 60 in an inoperative position. As shown in the drawings, this means includes a plurality of latching balls 67 each positioned in a slot 68 provided in the stationary sleeve 23. The diameter of each ball 67 is greater than the thickness of the sleeve 23. An annular groove 69 is provided on the inner surface of the ported thrust member 60, and a similar annular groove 70 is provided on the outer surface of the lower end of the latching sleeve 51. From a consideration of Figures 2, 3 and 4, it will be apparent that the latching balls 67 can assume one of two positions: the balls can extend inwardly into the groove 70 or can extend outwardly into the groove 69. In any event, the balls must extend into one of the grooves because the diameter of each is greater than the thickness of the stationary sleeve 23.

When the latching balls 67 extend outwardly into the groove 69, as shown in Figure 1, the ported thrust member 60 is latched in an inoperative position and the spring 63 is prevented from moving the thrust member 60 in a downward direction. On the other hand, when the latching balls 67 extend into the circumferential groove 70, as shown in Figures 3 and 4, the spring 63 moves the ported thrust member 60 downwardly to move the seat 37 away from the sealing ring 31 of the valve 28. When the latching balls 67 extend inwardly into the groove 70, the latching sleeve 51 is held against axial movement.

The operation of the device will now be described for a complete cycle of operation beginning with the parts in normal operating condition with the system under pressure. As shown in Figure 2, normal pressures communicated to the pressure chamber 41 through the nipple 14 maintain the seat 37 against the sealing ring 31 on the valve 28 to prevent escape of water. The weighted check valve 44 rests on the relatively weak spring 48, and since there is no differential pressure across the valve head 45 it drops away from the seat 47 under the action of gravity. So long as the pressure in the chamber 41 remains above a predetermined value the parts remain in the position shown in Figure 2. The latching balls 67 extend radially outwardly into the groove 69.

Should the unit pressure in the chamber 41 fall below such predetermined value, for example, ten pounds per square inch, the thrust member 60 under force of the spring 63 will move downwardly a small amount until all slack or lost motion is taken up between the latching balls 67 and the groove 69. This slight downward movement of the thrust member 60 does not result in separation of the sealing ring 31 and sealing surface 57 because the clearance under the nut 34 on valve 28 permits the valve 28 to move downwardly relative to the fixed sleeve 23 for a short distance. The latching balls 67 effectively latch the ported thrust member 60 against further downward movement unless the unit pressure in the chamber 41 continues to fall.

Should the pressure in the chamber 41 fall to a dangerously low value, for example, two pounds per square inch gauge pressure, the unit pressures in chambers 41 and 55 immediately fall to the same low value. The spring 54 then moves the latching sleeve 51 upwardly against the low unit pressure existing in the chamber 55. When the annular groove 70 in the latching sleeve 51 reaches a position immediately adjacent to the balls 67, the latter, due to the bevelled edges of the grooves, are thrust radially inwardly so that they enter the groove 70 and are retracted from the groove 69. This action releases the latching effect of the balls 67 on the ported thrust member 60. The spring 63 then moves the ported thrust member 60 downward with great force, and this drives the seat member 37 downward to the extreme lower position shown in Figure 3. This action separates the sealing ring 31 on the valve 28 from the sealing surface 57 on the seat 37.

It will be understood that separation of the valve 28 and seat 37 may occur before a partial vacuum exists in the chamber 41, for example when the unit pressure therein has fallen to the dangerously low value of two pounds per square inch. If the unit pressure in the chamber 41 continues to fall so that actual vacuum conditions exist, atmospheric air is drawn inwardly through the ports 75 in the body 15 and ports 74 in the member 60, through the annular space between the sealing ring 31 and sealing surface 57, through the central opening 73 and into the space 72 which communicates with the chamber 41. Atmospheric air is thus drawn into the nipple 14.

Should the unit pressure in the chamber 41 remain at a dangerously low value, for example, between zero and two pounds per square inch gauge pressure, the water in the chamber 41 passes outwardly through space 72, opening 73 and out through ports 74 and 75. Any appreciable flow of water has a velocity effect upon the valve head 45 and causes it to rise to the closed position against the seat 47 as shown in Figure 4. This velocity effect upon the head 45 is supplemented by the action of the relatively weak spring 48. In the closed position a small flow of water escapes outwardly through the groove 76 in the valve face 46. Excessive loss of water under dangerously low unit pressures is thus effectively prevented.

If the unit pressure in the chamber 41 subsequently returns to its usual operating range, the weighted check valve 44 is carried to its extreme upper position as shown in Figure 4, thereby preventing escape of water except for the relatively small flow through the groove 76. It will be observed that at this time the diaphragm 38 and seat 37 are urged downwardly by the force of spring 63 acting through ported thrust collar 60. As the unit pressure in chamber 41 increases the seat member is moved upwardly, causing the ported thrust collar 60 to rise and compress the spring 63. This stores energy in the spring 63 and compresses it to its cocked position shown in Figure 1. As the seat member 37 rises the sealing surface 57 contacts the seal ring 31 on the valve 28, thereby making an effective seal and preventing the further escape of any water. The seat member 37 rises until the shoulder 36 contacts the shoulder 27, thereby preventing further upward movement of the seat 37. As the seat member 37 rises, compressing the spring 63, groove 69 in the ported thrust member 60 reaches a location adjacent the slots 68, thereby permitting the latching balls 67 to move outwardly into groove 69. This action of the latching balls 67 permits the latching sleeve 51 to move downward under the force exerted by the upper diaphragm 49. The unit pressure in the chamber 55 above the diaphragm then holds the latching sleeve 51 in the position shown in Figure 2.

After the seat member 37 contacts the sealing ring 31 the unit pressure above and below the valve head 45 is equalized through the groove 76, and consequently the check valve 44 drops to an intermediate position as shown in Figure 2.

It will be understood that the strength of the spring 63 may be chosen to give any force desired. I have found, however, that satisfactory performance is obtained when its strength is such that a unit pressure of about ten pounds per square inch in the chamber 41 is sufficient to compress the spring 63 and move the thrust member 60 upwardly to latching position.

From the above description it will be understood that the pressure of the liquid is used initially to store energy in the spring 63. Should the liquid pressure later fall to a dangerously low value the valve is opened to vent the supply line to atmosphere and the force acting to open the valve is derived from the energy previously stored in the spring. The differential between atmospheric pressure and suction pressure which may exist in the service line is not relied upon to develop a force sufficient to open the vacuum breaker valve. The valve is opened positively by the relatively large force of the spring 63, and the reduced pressure in the service line is only utilized for tripping the latching device. Accordingly, the vacuum breaker valve is opened to admit atmospheric pressure even though the parts of the valve may be encrusted with mineral deposits following a long period of inaction.

A cover 81 may be placed over the body if desired and held in place by means of a nut 82 threaded on the post 83.

Having fully described my invention, it is to be understood that I do not wish to be limited to the details herein set forth, but my invention is of the full scope of the appended claims.

I claim:

1. In a vacuum breaker assembly, the combination of: means providing a chamber, a valve for venting the chamber to atmosphere, a spring acting to open the valve, means responsive to fluid pressure in said chamber adapted to deflect the spring to store energy therein, a latch device acting independently of the valve for normally maintaining the spring in deflected position, and fluid pressure responsive means arranged to trip the latch device to enable the energy stored in the spring to open the valve.

2. In a vacuum breaker assembly, the combination of: means providing a chamber, a valve for venting the chamber to atmosphere, stored energy means acting to open the valve, cooperating parts responsive to fluid pressure in said chamber adapted to store energy in said means, a latch device acting independently of the valve for normally maintaining said means in stored-energy condition, and fluid pressure responsive means arranged to trip the latch device to enable the energy stored in said means to open the valve.

3. In a vacuum breaker assembly, the combination of: a body having a chamber therein and a conduit connection communicating with said chamber, a valve having a pair of relatively movable parts adapted in closed position to confine fluid pressure within the chamber and in open position to vent the chamber to atmosphere, a spring operatively connected to effect relative movement of the valve parts toward open position, a latch device acting independently of the valve for normally maintaining the spring inactive, means responsive to fluid pressure in said chamber for retracting the thrust element to latching position, and fluid pressure responsive means arranged to trip the latch device when fluid pressure in the chamber falls below a predetermined value.

4. In a vacuum breaker assembly, the combination of: a body having a chamber therein and a conduit connection communicating with said chamber, a valve having a pair of relatively movable parts adapted in closed position to confine fluid pressure within the chamber and in open position to vent the chamber to atmosphere, a spring operatively connected through a thrust element to effect relative movement of the valve parts toward open position, the thrust element being mounted for movement relative to the valve, a latch device acting on the thrust element for normally maintaining the spring inactive, means responsive to fluid pressure in said chamber for retracting the thrust element to latching position, and fluid pressure responsive means arranged to trip the latch device when fluid pressure in the chamber falls below a predetermined value.

5. In a vacuum breaker assembly, the combination of a body having a chamber therein and a conduit connection communicating with said chamber, a valve assembly within the body including a pair of relatively movable parts, one of the parts having a vent opening communicating with said chamber and with space exterior to said body, the other part being arranged to close the opening, means responsive to fluid pressure in the chamber for maintaining the valve parts in closed position, resilient means opposing said pressure-responsive means, a releasable latch device normally maintaining the resilient means inactive, and fluid pressure-responsive means arranged to trip the latch device when pressure in said chamber falls below a predetermined value, whereby the resilient means may effect relative movement between the valve parts to vent the chamber through said vent opening.

6. In a vacuum breaker assembly, the combination of a body having a chamber therein and a conduit connection communicating with said chamber, a valve assembly within the body including a pair of relatively movable parts, one of the parts having a vent opening communicating with said chamber and with space exterior to said body, the other part being arranged to close the opening, means responsive to fluid pressure in the chamber for maintaining the valve parts in closed position, a coil spring opposing said pressure-responsive means, the pressure-responsive means being adapted under high pressure conditions in the chamber to deflect the spring and store energy therein, a releasable latch device normally maintaining the spring in deflected position, and additional fluid pressure-responsive means arranged to trip the latch device when pressure in said chamber falls below a predetermined value, whereby the energy stored in the spring may effect relative movement between the valve parts to vent the chamber through said vent opening.

7. In a vacuum breaker assembly, the combination of a body having a chamber therein and a conduit connection communicating with said chamber, a valve assembly within the body including a pair of valve parts mounted for relative axial movement, one of the parts having a vent opening communicating with said chamber and with space exterior to said body, the other part being arranged to close the opening, coaxial means responsive to fluid pressure in the chamber for maintaining the valve parts in closed position, a coaxial spring opposing said pressure-responsive means, a releasable latch device within the body normally maintaining the spring inactive, and fluid pressure-responsive means arranged to trip the latch device when pressure in said chamber falls below a predetermined value, whereby the spring may move one of the valve parts axially away from the other to vent the chamber through said vent opening.

8. In a vacuum breaker assembly, the combination of a body having a chamber therein and a conduit connection communicating with said chamber, a valve assembly within the body including a valve head and a movable valve seat, the valve seat having a vent opening communicating with said chamber and with space exterior to said body, the valve head being arranged to close the opening, means responsive to fluid pressure in the chamber for maintaining the valve seat and valve head in closed position, resilient means opposing said pressure-responsive means, a releasable latch device normally maintaining the resilient means inactive, and additional fluid pressure responsive means arranged to trip the latch device when pressure in said chamber falls below a predetermined value, whereby the resilient means may move the valve seat away from the valve head to vent the chamber through said vent opening.

9. In a vacuum breaker assembly, the combination of: a body having a chamber therein and a conduit connection communicating with said chamber, a valve assembly within the body including a pair of valve parts mounted for relative axial movement, one of the parts having a vent opening communicating with said chamber and with space exterior to said body, the other part being arranged to close the opening, coaxial means responsive to fluid pressure in the chamber for maintaining the valve parts in closed position, means opposing said pressure-responsive means, said means including a thrust element interposed between a spring and the first of said valve parts, said pressure-responsive means being adapted to act on the thrust element to deflect the spring to store energy therein, a releasable latch device acting upon the thrust element for normally maintaining the spring in deflected position, and additional fluid pressure-responsive means arranged to trip the latch device when pressure in said chamber falls below a predetermined value, whereby the spring may act through the thrust element to move said first valve part axially away from the other valve part to vent the chamber through said vent opening.

10. In a vacuum breaker assembly, the combination of: a body having a chamber therein and a conduit connection communicating with said chamber, a valve assembly within the body including a pair of valve parts mounted for relative axial movement, one of the parts having a vent opening communicating with said chamber and with space exterior to said body, the other part being arranged to close the opening, coaxial means responsive to fluid pressure in the chamber for maintaining the valve parts in closed position, means opposing said pressure-responsive means, said means including a thrust element interposed between a spring and the first of said valve parts, said pressure-responsive means being adapted to act on the thrust element to store energy in said spring, a releasable latch device acting upon the thrust element for normally maintaining the spring in stored energy position, additional fluid pressure responsive means arranged to trip the latch device when pressure in said chamber falls below a predetermined value, and a check valve carried on the valve part having the vent opening, the check valve having means acting to minimize flow of fluid from the chamber outward through the vent opening.

11. In a vacuum breaker assembly, the combination of: a body having a chamber therein and a conduit connection communicating with said chamber, a pair of relatively movable valve parts each mounted for axial movement on the body, the valve parts being adapted in closed position to confine fluid pressure within the chamber and in open position to vent the chamber to atmosphere, a spring operatively connected to move one of the valve parts to effect relative movement of the valve parts toward open position, a latch device normally maintaining the spring inactive, abutment means on the body preventing further axial movement of the other valve part after the latch device is fully released, and fluid pressure-responsive means arranged to trip the latch device when pressure in the chamber falls below a predetermined value, whereby the spring may move the first said valve part away from the other valve part to vent the chamber to atmosphere.

12. In a vacuum breaker assembly, the combination of: a body, a valve assembly including an axially movable valve seat and an axially movable valve head, a diaphragm connecting the valve seat to the body, the diaphragm cooperating with the valve seat and body to form a chamber, the valve seat having a vent opening communicating with said chamber and with space exterior to said body, a conduit connection communicating with said chamber, the valve head being mounted upon the body and arranged to close the opening, the diaphragm being responsive to fluid pressure in the chamber for maintaining the valve head and seat in closed position, a spring, a thrust element interposed between the spring and the valve seat, a releasable latch device acting upon the thrust element for normally maintaining the spring in retracted position, means on the body limiting axial movement of the valve head to prevent further movement thereof after the latch device is fully released, fluid pressure-responsive means arranged to trip the latch device when pressure in said chamber falls below a predetermined value, whereby the spring may move the thrust element and valve seat away from the valve head to vent the chamber through said vent opening.

13. In a vacuum breaker assembly, the combination of: a body having a chamber therein and a conduit connection communicating with the chamber, a valve having a pair of relatively movable parts adapted in closed position to confine pressure within the chamber and in open position to vent the pressure to atmosphere, means including a spring operatively connected to effect relative movement of the valve parts toward open position, said means also including a thrust element adapted to engage one of the valve parts, a latch device acting on the thrust element for maintaining the spring inactive, the latch device including a central stationary member adjacent the thrust element and a movable member slidably mounted with respect to the stationary member, the stationary member having a transverse opening extending through a wall thereof, a ball received in said opening, the diameter of the ball being greater than the thickness of the wall, the thrust element and the movable member each being provided with a recess to receive a projecting portion of the ball so that either the movable member or the thrust element may be secured with respect to the stationary member, and fluid pressure-responsive means for moving the movable member with respect to the stationary member when pressure in the chamber falls below a predetermined value.

14. In a vacuum breaker assembly, the combination of: a body having a chamber therein and a conduit connection communicating with the chamber, a valve having a pair of relatively movable parts adapted in closed position to confine pressure within the chamber and in open position to vent the pressure to atmosphere, means including a spring operatively connected to effect relative movement of the valve parts toward open position, said means also including a thrust element adapted to engage one of the valve parts, a latch device acting on the thrust element for maintaining the spring inactive, the latch device including a central stationary tubular member on which the thrust element is mounted, an inner movable sleeve slidably mounted within the stationary tubular member, the stationary tubular member having a plurality of transverse openings extending through the wall thereof, a ball received in each of said openings, the diameter of the balls being greater than the thickness of the wall, the thrust element and the movable sleeve each being provided with recesses to receive a projecting portion of the balls so that either the inner sleeve or the thrust element may be secured with respect to the stationary tubular member, and fluid pressure-responsive means for moving the sleeve with respect to the stationary tubular member when pressure in the chamber falls below a predetermined value.

15. In a vacuum breaker assembly, the combination of a body having a chamber therein and a conduit connection communicating with said chamber, a valve assembly including a pair of relatively movable parts, the first valve part having a vent opening communicating with said chamber and with space exterior to the body, the second valve part being arranged to close the opening, said second valve part being capable of limited axial movement to maintain closure with the first valve part during partial travel thereof, said first valve part being capable of greater axial movement to effect separation of the valve parts and open the chamber to said space, means including a spring operatively connected to effect relative movement between said valve parts toward open position, said chamber including fluid pressure-responsive means for simultaneously moving the first valve part axially toward the second valve part to close the opening and to move said spring to retracted position, means including a releasable latch device for normally maintaining the spring in retracted position, and a second pressure responsive means operatively connected with said chamber adapted to trip said latch device when the pressure in the chamber falls below a predetermined value, whereby the spring may effect relative movement between the valve parts to vent the chamber through said opening.

16. In a vacuum breaker assembly, the combination of: a body having a chamber therein, means including a valve assembly providing a passage for venting the chamber to atmosphere, the valve assembly having relatively movable parts, the valve parts having a fluid pressure responsive area exposed to atmosphere whereby atmospheric pressure tends to effect relative movement of the valve parts toward open position, the valve parts also having a fluid pressure responsive area exposed to fluid pressure in said chamber whereby said fluid pressure tends to effect relative movement of the valve parts toward closed position, means including a spring operatively connected to effect relative movement of the valve parts toward open position, a latch device operable to maintain the spring inactive, and fluid pressure responsive means arranged to trip the latch device and effect opening movement of the valve parts to vent the chamber to atmosphere when fluid pressure in the chamber falls below a predetermined value.

17. In a vacuum breaker assembly for a water line, the combination of: a valve body having an inlet and an outlet open to atmosphere, cooperating valve parts in the body adapted when in open position to connect said inlet to said outlet, force means including an element acting to effect relative movement of the valve parts toward open position, a latch acting independently of the valve parts for holding said force means inoperative, means responsive to pressure in the inlet for retracting said element to latching position, and trigger means responsive to fluid pressure within the inlet and operative to release the latch when the fluid pressure in the inlet falls to a predetermined value.

References Cited in the file of this patent

UNITED STATES PATENTS

| Number | Name | Date |
| --- | --- | --- |
| 1,461,010 | Amdursky | July 3, 1923 |
| 2,363,123 | Franck | Nov. 21, 1944 |
| 2,396,815 | Blum | Mar. 19, 1946 |
| 2,484,940 | Franzheim | Oct. 18, 1949 |

FOREIGN PATENTS

| Number | Country | Date |
| --- | --- | --- |
| 831,778 | France | 1938 |